United States Patent [19]

Hebert

[11] 4,028,032
[45] June 7, 1977

[54] APPARATUS FOR PRECISION ELECTROSTATIC PINNING
[75] Inventor: Elie Loyd Hebert, Taylors, S.C.
[73] Assignee: Celanese Corporation, New York, N.Y.
[22] Filed: Mar. 9, 1976
[21] Appl. No.: 665,353
[52] U.S. Cl. .......................... 425/174.8 E; 264/24; 425/404
[51] Int. Cl.² .......................................... B29D 7/22
[58] Field of Search ............ 425/174.8 E, 404, 377, 425/445, 446; 226/94; 317/262 E X, 262 A; 264/22, 24; 219/10.81; 313/326

[56] References Cited
UNITED STATES PATENTS

| | | | |
|---|---|---|---|
| 2,491,889 | 12/1949 | Bennett et al. | 264/22 X |
| 2,850,907 | 9/1958 | Foster | 317/262 E X |
| 3,758,251 | 9/1973 | Gillyns et al. | 425/174.8 E |
| 3,898,026 | 8/1975 | Sauer et al. | 425/174.8 E |

Primary Examiner—Francis S. Husar
Assistant Examiner—Mark Rosenbaum
Attorney, Agent, or Firm—M. Bressler; L. I. Grim; T. J. Morgan

[57] ABSTRACT

An apparatus for the precision positioning of electrostatic pinning means. The electrostatic pinning means, which significantly improves pinning of a thermoplastic polymeric film cast upon a moving surface, by electrostatic force, is precisely positioned, in relation to an extrusion means and the moving surface, by means of the precision positioning apparatus. The apparatus includes a frame moveable in vertical and horizontal directions. The apparatus further includes the pinning means and support means, connected to the frame, for holding the electrostatic pinning means. Horizontal and vertical adjusting means comprising horizontal and vertical actuating means connected to horizontally and vertically moveable means responsive to the horizontal and vertical actuating means, respectively, are connected to the frame to permit separate horizontal and vertical movements to precisely position the electrostatic pinning means. Horizontal and vertical precision control means are additionally provided, on the moveable frame of the apparatus, to insure that no skewing occurs during horizontal and vertical movements actuated by said horizontal and vertical adjustment means.

18 Claims, 5 Drawing Figures

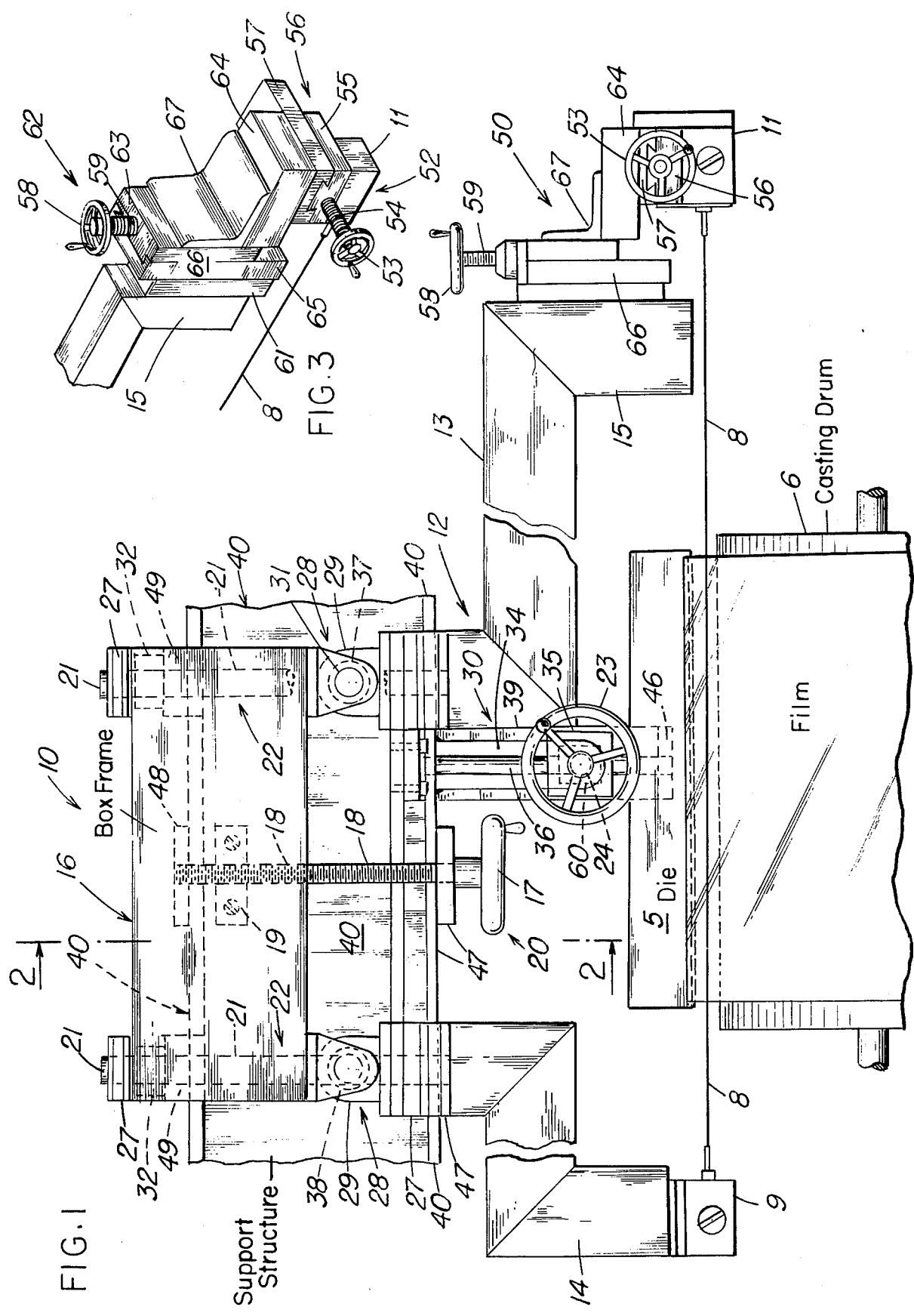

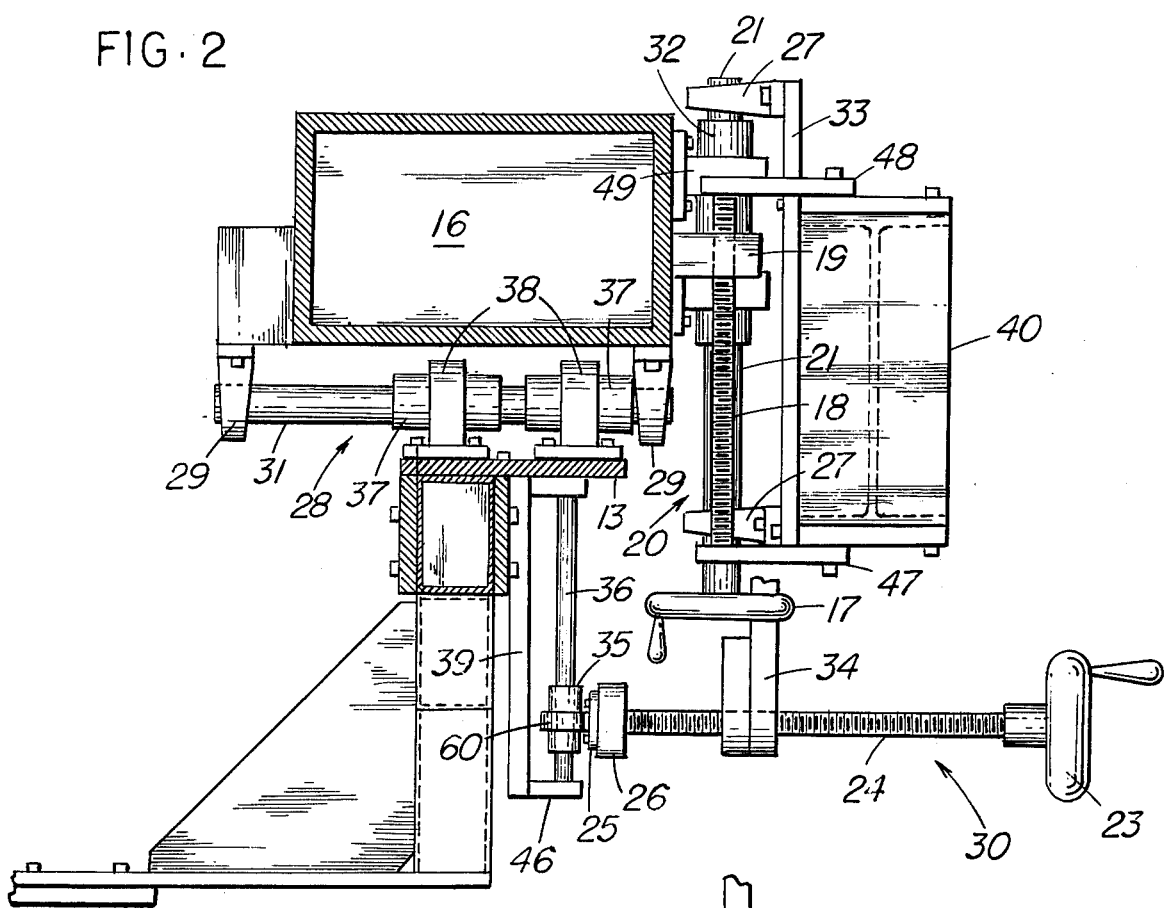
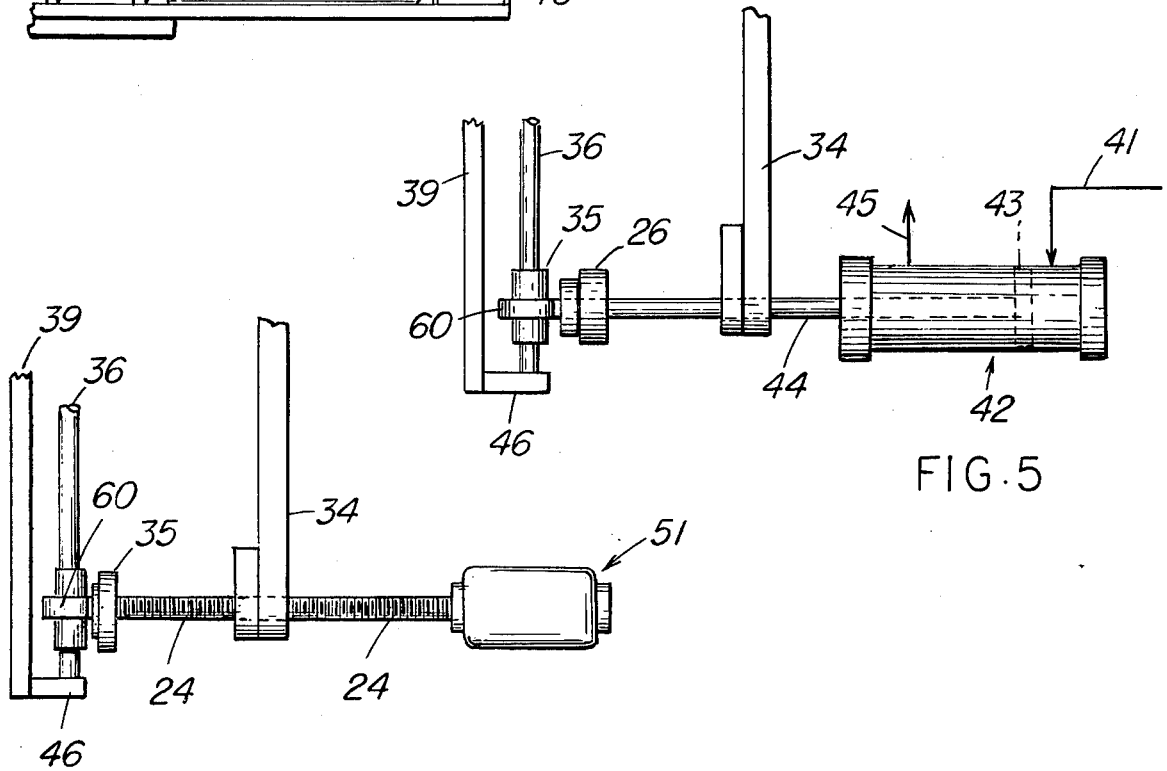

APPARATUS FOR PRECISION ELECTROSTATIC PINNING

BACKGROUND OF THE INVENTION

1. Field of the Invention

The instant invention is directed to an apparatus for the precision positioning of an electrostatic pinning means which holds thermoplastic polymeric film onto a moving surface by electrostatic force. More specifically, the instant invention is directed to an apparatus for the precision positioning of electrostatic pinning means by means of a frame which is moveable only in the horizontal and vertical directions. Still more specifically, the instant invention is directed to an apparatus for precision positioning of electrostatic pinning means in which the apparatus is provided with a frame, movable only in the horizontal and vertical positions, and which furthermore includes horizontal and vertical adjusting means to permit movement of the frame in the horizontal and vertical directions, respectively.

2. Description of the Prior Art

The method of "electrostatic pinning," that is, the holding of a thermoplastic polymeric film onto a moving surface, usually a casting drum, has generally been accepted as one of the most effective methods of maintaining good contact between a moving surface and a molten film. This, in turn, has resulted in an excellent method for successful casting of thermoplastic polymeric film. The success attending this method of casting polymeric films has encouraged many investigators to seek improvements in the methods and apparatus employed in electrostatic pinning to improve this casting procedure so as to increase the speed at which films are formed on a moving surface. These improvements are aimed at increasing the speed of casting without decreasing the quality of the cast film produced.

Among the methods and apparatus employed to increase casting speeds have been advances in the types of electrodes employed. One such recent innovation has been the employment of a two-electrode electrostatic pinning system. U.S. Pat. Nos. 3,655,307, 3,660,549 and 3,820,929 have employed this type of system to provide increased casting speeds without decreasing film quality. While this system represents an advance in the art, it obviously also significantly increases the complexity of the electrostatic pinning apparatus.

Another innovation for increasing casting speeds, by the use of electrostatic pinning, has been modifications in the moving surface, usually a casting drum, upon which the molten thermoplastic melt is cast to form the film. In this method a matte surface is employed. The use of a matte surface results in enhanced pinning of the melt onto the casting drum. This, in turn, results in increased casting speeds. However, such a method is not applicable for all polymeric films. The matte surface leaves minute film surface distortions which prevent the film from being used in applications requiring exceedingly clear film. Thus, the use of film cast on a matte surface cannot be employed to produce film for photographic, metallizing and other similar end uses requiring exceedingly clear films free of surface distortions.

It is to be noted that the above innovations require significant apparatus modification and thus represent a significant capital expense. Thus, investigators have attempted to increase film casting rates without modifying existing equipment. In one such method, the voltage imposed on the pinning electrode is increased and/or the pinning electrode is moved closer to the casting drum. Either or both of these modifications result in significantly increased pinning force. It is well established that the greater the electrostatic pinning force, the more rapid the rate of film casting. However, increasing electrostatic pinning voltage, or positioning the pinning electrode very close to the casting drum often results in arcing, that is, sparking between the pinning electrode and the casting drum. This results in a shut-down of the film forming operation and thus effectively limits the extent to which this method can be used.

Another proposed method of increasing film casting speeds, without the attendant capital expense and system complexity associated with the first two above solutions, has been to merely increase the rate of casting in the hope that the resultant film produced, at speeds in excess of the current state of the art, possesses equivalent film properties. However, this solution has been unsuccessful in that at speeds in excess of the current state of the art so called "pinner bubbles" appear on the film surface. Pinner bubbles are small raised bubbles that appear on the film surface due to the inclusion of air that is able to get between the surfaces of the casting drum and the polymeric melt as it solidifies. The air is able to get between the drum and the film due to inadequate electrostatic pinning force at the touch-down point, that is, the point at which the polymeric melt initially contacts the surface of the rotating casting drum.

The above remarks strongly suggest the need for a new means for electrostatic pinning polymeric film as the molten film is cast on a moving surface. This new means of electrostatic pinning should represent a minimal capital expenditure as well as minimal increase in system complexity. Such a new means should, however, significantly increase the rate of polymeric film casting without any sacrifice in film quality.

SUMMARY OF THE INVENTION

The instant invention is directed to an apparatus which represents a minimal capital expense and no increase in system complexity yet effects a significant increase in film casting speed without any sacrifice in film quality. Indeed, film produced by use of the apparatus of the instant invention oftentimes is superior in quality compared to the same film made in accordance with the procedures of the prior art which occurs at much lower casting speeds.

In accordance with the instant invention an apparatus is provided for the precision positioning of electrostatic pinning means. The electrostatic pinning means is employed to provide an electrostatic force to hold a thermoplastic polymeric melt to a moving surface. The apparatus includes, in addition to the electrostatic pinning means, a frame moveable in the horizontal and vertical directions. Pinning means support means, to hold the pinning means, connected to the frame, are provided on the apparatus at each end of the frame. The apparatus further comprises horizontal adjusting means. The horizontal adjusting means includes a horizontal actuating means connected to a horizontally moveable member responsive to the horizontal actuating means. The horizontally moveable member is connected to the frame. The apparatus also includes a vertical adjusting means comprising a vertical actuating means connected to a vertically moveable member responsive to the vertical actuating means. The vertically moveable member is similarly connected to the frame. Horizontal and vertical precision control means are furthermore provided on the apparatus of this invention in order to insure that horizontal and vertical movement, actuated by the horizontal and vertical adjustment means respectively, do not cause any skew movement of the frame.

BRIEF DESCRIPTION OF THE DRAWINGS

The instant invention may be better understood by reference to the accompanying drawings of which:

FIG. 1 is a front elevation view of the precision positioning apparatus of the instant invention with the support structure shown behind the adjustment means for clarity;

FIG. 2 is sectional view taken along plane 2—2 of FIG. 1;

FIG. 3 is a perspective view of a feature of the precision positioning apparatus of the instant invention;

FIG. 4 is a schematic view illustrating an alternate embodiment of one element of the precision positioning apparatus; and FIG. 5 is a schematic view, illustrating another preferred embodiment of one element of the precision positioning apparatus.

DETAILED DESCRIPTION

The pinning means positioning apparatus of the instant invention represents a significant advance in the art over the pinning means positioning apparatus of the prior art. In the prior art pinning means positioning was accomplished manually by an operator who positioned the pinning means such that it appeared, to the operator, to be parallel to the casting drum above which the pinning means is disposed. This was accomplished by adjusting means, in mechanical cooperation with the pinning means holding means, provided at both ends of the pinning means. In this arrangement, therefore, independent adjustment of both ends of the pinning means is provided. Thus, the system of the prior art not only suffers from the defect of approximation of parallel positioning of the pinning means, but moreover adjustment to provide parallel disposition is very difficult and time consuming. In addition, with the development of much wider casting drums, to increase production rates, the ability of an operator to "eye in" the pinning means parallel to the casting drum is made even more difficult and indeed almost impossible. The apparatus of the instant invention, on the other hand, provides pinning means adjustment resulting in parallel alignment of the pinning means in relation to the casting drum upon which the thermoplastic melt is cast.

Turning to the drawings, the positioning apparatus of the instant invention is generally indicated at 10. The apparatus 10 includes a frame generally indicated at 12. In the preferred embodiment illustrated in the drawings, the frame comprises a horizontal member 13 and vertical frame members 14 and 15. The horizontal member 13 and vertical frame members 14 and 15 may be fabricated as a unitary member or may be detachably attached by suitable connecting means. It is to be appreciated that the frame design of the preferred embodiment illustrated in the drawings represents only one preferred embodiment of the frame 12 of the instant invention. For example, the frame may be an inverted V or an inverted U-shaped design. Other frame designs may also be employed.

In the preferred embodiment illustrated in FIGS. 1 and 2, the horizontal frame member 13 is connected to a moveable frame member 16. The moveable frame member 16 is also denominated as the box frame. The box frame 16 provides the support necessary for maintaining the horizontal and vertical adjusting means in alignment. The criticality of this function will be made apparent with the further description of the apparatus.

The apparatus furthermore includes a rigid stationary support structure 40. The support structure 40 is employed to attach connectors to mount non-moveable elements which are required for the proper operation of the horizontal adjustment and precision control means as well as the vertical adjustment and precision control means as will be explained hereinafter.

The precision positioning apparatus 10 includes a pinning means. In preferred embodiments the pinning means is a fine wire, a knife edge or a plurality of pointed electrodes. In the preferred embodiment illustrated in the drawings the pinning means is a circular wire denoted hereinafter as a pinning wire. The pinning wire is designated by reference numeral 8.

Included also in apparatus 10 is support means for the pinning means. In the preferred embodiment shown in the drawings the pinning means support means comprises a pair of pinning means support boxes. One of the pinning means support boxes, denoted at 9, is stationary. The other pinning wire support box 10 is moveable. The employment of one stationary and one moveable pinning wire support box will be explained in greater detail hereinafter.

A vertical adjustment means, another element of the apparatus 10, generally indicated at 20, is connected to the frame 12. In the preferred embodiment illustrated in FIGS. 1 and 2, the vertical adjusting means is connected to the box frame 16, a part of the horizontal frame member 13. The vertical adjusting means 20 includes a vertical actuating means, which in a preferred embodiment is a handwheel 17. The vertical adjusting means 20 also comprises a vertically moveable means responsive to the vertical actuating means 17. In a preferred embodiment, illustrated in FIGS. 1 and 2, the vertically moveable means comprises a rotatable threaded bolt 18, stationary in the vertical direction, in communication with a vertically moveable block 19. The block 19 cooperates with the threaded bolt 18 by means of a tapped hole (not shown) provided thereupon. The block 19 is either an integral part of the box frame 16 or, alternatively, detachably connected to the box frame 16. A pair of support brackets, a lower bracket 47 and an upper bracket 48 may be provided to support the bolt 18 in its upright vertical position. The brackets 47 and 48 are connected to the stationary support structure 40.

The precision positioning apparatus 10 is equipped with a vertical precision control means generally denoted at 22. The vertical precision control means 22 is provided to prevent any component of movement in the horizontal direction during actuation of the vertical adjusting means 20. Thus, any movement, in the vertical direction, actuated by the vertical adjusting means 20 results in substantially no horizontal movement of the positioning apparatus 10.

The control means 22 includes at least one precision round bar 21. In one preferred embodiment, illustrated in the drawings, the vertical movement control means 22 comprises a pair of precision round bars 21. Each of the round bars 21 is held stationary by a pair of rigid support members 27. The rigid support members 27 are connected to a stationary member 33. Stationary member 33 is connected to, and a part of the stationary support structure 40.

The control means 22 includes at least one linear slide bearing 32 provided on each precision round bar 21. In one preferred embodiment, a plurality of bearings 32 are provided. They are connected to the box frame 16 by means of collars 49 which are disposed about the bearings 32. In response to vertical movement precipitated by the vertical adjusting means 20 the bearings 49 slide vertically along the round bars 21, such that the frame 12 moves solely in the vertical direction.

It should be appreciated that the vertical movement control means 22, illustrated in the drawings, represents but one means for insuring that the frame moves solely in the vertical direction upon actuation of the vertical adjusting means 20. Other methods which result in the same effect, that is, prevention of movement in the horizontal dimension, are within the contemplation of this invention.

Also connected to the frame 12 is a horizontal adjusting means, generally designated at 30. The horizontal adjusting means 30 comprises a horizontal actuating means as well as a horizontally moveable member responsive to the horizontal actuating means. In the preferred embodiment illustrated in FIGS. 1 and 2, the horizontal actuating means is a handwheel 23. In this preferred embodiment, the horizontally moveable member is a horizontally moveable threaded bolt 24. In this preferred embodiment the end of the bolt 24 is provided with a thrust bearing 25. A collar 26 is disposed adjacent to the thrust bearing 25. The bolt 24 terminates with a linear slide bearing 35, disposed adjacent to the thrust bearing 25, and connected about a precision round bar 36 by a collar 60.

A horizontal precision control means, generally indicated at 28, is provided on the frame 12 of the precision positioning apparatus 10. The control means 28 includes rigid support members 29, supporting at least one precision round bar 31. At least one slide bearing, connected to the frame, is provided. In one preferred embodiment two linear slide bearings 37 rigidly affixed to the horizontal frame member 13 by means of a pair of collars 38 move horizontally along each precision round bar 31 in response to the horizontal movement imparted by the horizontal adjusting means 30 to a support stand 46 to the collars 38 and hence to the linear slide bearings 37.

It is noted that both the vertical adjusting means 20 and the horizontal adjusting means 30, in the preferred embodiment illustrated in the drawings, both employ a handwheel as an actuating means as well as a threaded bolt as the moveable means responsive to the actuating means. It is to be emphasized that other methods which actuate movement in either the horizontal or vertical direction, as well as means moveable horizontally or vertically in response to the actuating movement, may be substituted for the preferred apparatus illustrated in the drawings.

FIG. 5 illustrates such an alternative preferred embodiment of the vertical or horizontal adjusting means. FIG. 5 depicts an embodiment employing a hydraulic actuating means. In FIG. 5 a source of a pressurized liquid is provided through conduit 41 into a cylinder 42. A piston 43 responsive to the pressure in the cylinder 42 is connected to a moveable rod 44. An outlet for the spent liquid is provided through conduit 45. Thus, this system employs a source of pressurized liquid provided with means of ingress and egress. The gas in the closed cylinder represents the actuating means. It is noted that FIG. 5 is shown analogous to the horizontal adjusting means 30. Thus, the rod 44 replaces the moveable threaded screw 24. Thrust bearing 25, collar 26 and stationary support 34 connected to support 40, are shown in this drawing to illustrate how the hydraulic preferred embodiment replaces the manual preferred embodiment of FIGS. 1 and 2. This hydraulic system can also be employed as an alternate preferred embodiment for the vertical adjusting means. In such a case the shaft 44 is connected to the moveable block 19 to thus actuate the frame in the vertical direction.

FIG. 4 illustrates a third preferred embodiment of the vertical and horizontal adjusting means. In FIG. 4 the preferred actuating means is an electric motor 51. The motor 51 replaces the handwheel and is applicable for use to rotate a threaded bolt, here shown as the moveable, and rotatable threaded bolt 24. Obviously, this embodiment can be used in conjunction with a system in which the threaded bolt is nonmoveable as in the vertical adjusting means 30 shown in detail in FIG. 2.

In a preferred embodiment, the positioning apparatus 10 of the instant invention is provided with a skew correcting actuating means generally indicated at 50. In a preferred embodiment illustrated in FIG. 3 the skew correcting adjustment means 50 is connected to and in communication with the pinning means support means. Specifically, the skew correcting adjustment means is connected to and in communication with the moveable pinning means support box 11 of the pinning means support means.

The skew correcting adjustment means 50 includes a horizontal skew adjusting means generally indicated at 52. The adjusting means 52 includes a horizontal actuating means. In the preferred embodiment illustrated, the horizontal skew actuating means is a handwheel 53. The horizontal adjusting means, furthermore, includes a horizontally moveable means responsive to the horizontal actuating means. In this preferred embodiment the responsive means comprises a threaded bolt 54 responsive to the movement of the handwheel 53. The horizontally moveable responsive means further comprises a moveable precision dovetail slide generally indicated at 56. The dovetail slide 56 includes a moveable member 55 which is connected to the threaded bolt 54 and moves responsive to bolt movement, as well as a stationary member 57. The stationary member 57 provides the dovetail frame over which the moveable member 55 moves. The pinning means support box 11 is connected to the moveable member 55 of the precision dovetail slide 56.

The skew correcting adjustment means 50, in addition, comprises a vertical skew adjusting means generally indicated at 62. The vertical skew adjusting means 62 of the skew correcting adjustment means 50 includes a vertical actuating means provided by handwheel 58. The vertical skew adjusting means 62, furthermore, includes vertically moveable means responsive to the vertical actuating means 58. These means, in the preferred embodiment illustrated at FIG. 3, comprises a threaded bolt 59 moveable in response to the movement of the handwheel 58. The vertically moveable responsive means also includes a moveable precision dovetail slide 66. The dovetail slide 66 is designed in the same manner as the dovetail slide 56. Thus, it includes a moveable member 63 connected to, and responsive to the movement imparted by the handwheel 58. The moveable member 63 slides in a stationary dovetail shaped member 65. The stationary member 65 of the dovetail slide 66 is connected to the vertical frame member 15 of the frame 12 by means of a spacer block 61. Vertical movement of the moveable member 63 of the precision dovetail slide 66 is communicated to the pinning means support box 11 by means of a vertically moveable member 64. A connecting bracket 67 is provided to connect the member 64 to the moveable member 63 of the dovetail slide 66.

It is to be appreciated that the skew correcting actuating means 50 preferably employs elements smaller in size than those employed to provide the vertical and horizontal adjusting means, 20 and 30, respectively. It is also to be appreciated that other embodiments providing horizontal and vertical movement of the moveable pinning means support box 11 may be employed to provide skew adjustments.

In operation, the pinning means, in one preferred embodiment the pinning wire 8, is disposed in parallel relationship with the surface of the casting drum, illustrated in FIG. 1. It is noted that the extrusion die, denoted at 5 is similarly disposed such that the die opening is parallel to the drum 6. Disposition of the wire 8 parallel to the casting drum 6 is obviously critical. One method to provide this configuration is to construct the casting drum 6 and the precision positioning apparatus 10 such that the pinning means 8 is parallel to the surface of the drum. When the system is constructed to provide parallel positioning, the die lip opening of the extrusion die 5 is also set parallel to the casting drum 6. However, in many applications that is not provided and in such cases the preferred embodiment, illustrated in the drawings, employing the skew correcting actuating means 50 is used. In this embodiment, the stationary pinning means support box 9 holding one end of the pinning means 8 remains stationary throughout. The moveable pinning means support 11 is adjusted in the vertical and horizontal directions to dispose the pinning means 8 in exact parallel configuration with the surface of the drum 6. In this way, any skew present in the pinning means 8 is eliminated.

The operation of the precision positioning apparatus 10 primarily begins after parallel relationship between the pinning means 8 and the surface of the drum 6 is obtained. This is said because the positioning of the pinning means 8 parallel to the surface of the drum 6 is not enough to produce optimum casting conditions. As those skilled in the art are aware, the distance between the pinning wire 8 and the surface of the drum 6, at the point where the thermoplastic melt touches down on the drum is critical. The positioning of the wire is a complex function of flim forming speed, the smoothness of the casting drum surface, and other variables. Obviously, the optimum positioning of the pinning wire changes with any change in any of the variables which affect this optimum positioning. The precision positioning apparatus of this invention permits changing of the pinning means position without moving said pinning means out of parallel relationship with the surface of the casting drum.

To move the pinning means 8 vertically closer to, or further from, the casting drum 8, the vertical adjusting means 20 is activated. In the preferred embodiment illustrated in the drawings this is accomplished by turning handwheel 17, the vertical actuating means of the vertical adjusting means 20. The turning of handwheel 17 rotates the threaded bolt 18. It is to be noted that the threaded bolt 18 does not move in the vertical direction. However, the rotation of the threaded bolt 18 moves the moveable block 19 in the vertical direction. The moveable block 19 is activated by means of the tapped hole provided on the block 19 through which the bolt 18 rotates. The vertical movement of the moveable block 19, in turn, vertically moves the box frame 16. The box frame 16, as indicated previously, is connected to the horizontal frame member 13. Thus, the frame 12 of the positioning apparatus 10 moves in a vertical direction. As a result, the pinning means support means 9 and 11, attached to vertical frame members 14 and 15, moves vertically which ultimately moves the pinning means 8. That is, the frame 12, which includes vertical members 14 and 15, moves vertically. In this way the pinning means 8, retaining its parallel configuration, moves vertically relative to the casting drum 6.

To assure that no skewing occurs during vertical movement of the frame 12, that is, to prevent any undesirable horizontal movement which will skew the wire, is the function of the vertical precision control means 22. The control means 22 includes a pair of precision round bars 21 which are held firmly to the support frame 40. The box frame 16 and therefore the frame 12, to which the box frame 16 is affixed, move vertically up and down the two round bars 21 by means of a plurality of linear slide bearings 32 which are connected to the box frame 16 by means of collars 49. There are two bearings 32 on each end of each round bar 21. Thus, in the preferred embodiment illustrated in the drawings, there are a total of four linear bearings employed in the system.

It is to be emphasized that vertical movement of round bar 36, which occurs during the above described vertical movement, does not effect movement of the horizontal adjusting means 30. The linear slide bearing 35 permits vertical motion of the precision round bar 36 without causing movement of the threaded bolt 24 or any other element of the horizontal adjusting means 30 attached thereto.

Horizontal adjustment, that is, movement of the pinning means 8 in the horizontal direction without disturbing the parallel configuration of the casting drum 6 to the pinning means 8 is accomplished by actuation of the horizontal adjusting means 30.

To effect movement in the horizontal direction such that the pinning wire 8 remains parallel to the casting drum 6 the handwheel 23 is moved either forward or backward. This horizontal movement moves the threaded bolt 24 which pushes or pulls, as the case may be, against the linear slide bearing 35 by means of the collar 60 which surrounds it. This effects horizontal movement of the support stand 46 which anchors the precision round bar 36 against which the horizontal force on the thrust bearing 35 is transmitted. The support stand 46 is connected to the horizontal frame member 13. Thus, the horizontal movement initiated at the handwheel 23 ultimately is communicated to the moveable frame 12 with the result that the pinning means 8 is moved horizontally, with reference to the casting drum, without charging its parallel configuration between the surface of the casting drum.

Operation of the horizontal actuating means 30 does not result in any extraneous vertical movement that would skew the pinning means 8, that is, move it out of parallel alignment with the surface of the casting drum 6. This is prevented by the horizontal precision control means 28. When horizontal movement is effected by movement of the support stand 46 which causes horizontal movement of the frame 12, specifically the horizontal frame member 13, the horizontal movement is communicated to the linear slide bearings 37 by means of the collars 38 which are attached to the horizontal frame member 13 of frame 12. It is noted that the horizontal movement of the linear slide bearings 37 do not cause movement of the box frame 16. This is because the precision round bars 31 do not move as the linear slide bearings 37 moves horizontally along its surface. Thus, the rigid support members 29, holding the round bar 31, do not move horizontally. In turn the box frame 16, to which the members 29 are rigidly affixed, does not move. In view of the non-movement of the box frame 16, there is no disturbance of the vertical adjusting means 20 which is connected to the box frame 16. This prevents actuation of means 20 with the result that no extraneous vertical movement occurs during horizontal adjustment.

The above discussion of the operation of the vertical adjusting means 20 and the horizontal adjusting means 30 is given with reference to the preferred embodiment, illustrated in FIGS. 1 and 2, in which manual adjusting means in the form of handwheels 17 and 23 are employed. It is to be appreciated, that substitution of manual means by electrical energy in the form of electric motor 51, in the preferred embodiment illustrated in FIG. 4, or by hydraulic energy in the form of injection and removal of a pressurized liquid through conduits 41 and 45 respectively, in the preferred embodiment illustrated in FIG. 5 merely changes the activating source without, in any other way, affecting the mode of operation of the precision positioning apparatus 10.

The operation of the skew correcting adjustment means 50 has as its sole purpose the movement of the moveable pinning means support 11. Activation of the skew correcting adjustment means 50 does not effect movement of the frame. On the other hand, movement of the frame 12 by means of either the vertical adjusting means 20 or the horizontal adjusting means 30 effects movement of the moveable pinning support 11. However, vertical or horizontal movement effected by the vertical or horizontal adjusting means 20 or 30 respectively also moves the stationary pinning support 9 so that there is no relative movement between supports 9 and 11. Of course, adjustment resulting from movement of skew correcting actuating means 50 results in relative movement between the stationary pinning support 9 and the moveable pinning support 11.

The operation of the skew correcting adjustment means 50 represents separate operation of the horizontal adjusting means 52 and the vertical adjusting means 62.

When the pinning means 8 is skewed horizontally the horizontal adjusting means 52 is activated by clockwise or counterclockwise movement, depending on whether horizontal movement of the support box 11 is desired in the forward or backward direction, of the handwheel 53. The handwheel 53 rotates threaded bolt 54, connected thereto, which horizontally moves the dovetail slide 55. The moveable support box 11 is connected to the slide 55 so that the wire is moved horizontally to set the pinning means 8 parallel to the casting drum 6 in the horizontal plane.

Adjustment of any vertical skewing is effected by rotation of handwheel 58. This causes rotation of threaded bolt 59 causing vertical movement of the dovetail slide 63. This vertical movement is transmitted to vertically moveable member 64, which is connected to the slide 63 by means of connecting bracket 67. This vertical movement is thus transmitted to the horizontal adjusting means 52 which is connected to both member 64 and moveable pinning means support box 11. Vertical movement of the box 11 moves pinning means 8 to correct any vertical skew between it and the casting drum 6.

The following examples are given to illustrate the apparatus of this invention. They should not be construed, in any way, as limiting the scope and spirit of the invention illustrated by these examples.

EXAMPLE I

An example was undertaken to illustrate the limitations of the pinning positioning apparatus of the prior art. In this example, a pinning means, a metal wire, was positioned over a casting drum by means of a pair of pinning wire support boxes each provided with means for moving each of the two supports in the horizontal and vertical directions. Adjustments were made manually by an operator experienced in this art. In this example, polyethylene terephthalate thermoplastic melt was extruded through a 16 inch die onto a mirror finish casting drum. The drum had an outer diameter of two feet and was 22 inches long. The pinning wire, having a diameter of 0.008 inch, was disposed 0.1875 inch above the surface of the drum, as measured along a plane normal to the surface of the drum from the wire. The die, having an opening 16 inches long through which the thermoplastic melt was extruded onto the drum, was located 0.625 inch above the surface of the drum measured along a normal line from the die opening to the uppermost point on the drum.

The extrudate was extruded through the die opening at a rate sufficient to produce a cast sheet of 0.006 inch (6 mils). The pinning wire, connected to a DC power source, provided a pinning voltage of 8 kilovolts. The drum was rotated at a speed sufficient to produce 110 feet of 6 mil thick and 14 inch wide (due to neckdown) cast sheet per minute. At this rate, acceptable polyethylene terephthalate cast sheet was produced. Thus, good pinning was demonstrated at 110 feet per minute.

With success at 110 feet per minute, the casting drum speed of the apparatus of the prior art was increased to produce 6 mil thick — 14 inch wide polyethylene terephthalate cast sheet at a rate of 120 feet per minute. All other conditions remained the same as during the previous run in which cast sheet film was produced at a rate of 110 feet per minute. However, at a speed of 120 feet per minute pinner bubbles appeared. Pinner bubbles are evidenced by minute bubbles that appear on the surface of the cast sheet. These bubbles demonstrate the presence of air between the cast sheet and the drum, caused by inadequate electrostatic force. Pinner bubbles could not be eliminated by operator adjustments employing the two sets of adjustment means provided at each support box holding the pinning wire. The test employing the prior art apparatus was therefore terminated.

The above example demonstrated that at speeds in excess of 110 feet per minute, the prior art precision positioning means could not be employed to produce satisfactory polyethylene terephthalate film.

EXAMPLE II

Using much of the same equipment, that is, the same drum, the same pinning wire maintained at the same voltage and the same relative position of the pinning wire, the die and the drum as employed in Example I, the experiment of Example I when repeated. However, the alignment of the wire with the drum was accomplished by means of the apparatus of the instant invention. The parallel configuration of the wire in relation to the drum resulted in satisfactory film production at 110 feet per minute. The film produced was again polyethylene terephthalate cast sheet having a thickness of 6 mils and a width of 14 inches.

The speed of the drum was then increased to 120 feet per minute. Again, the film produced, polyethylene terephthalate cast sheet having a thickness of 6 mils and a width of 14 inches, did not have any surface defects such as pinner bubbles. With success at 120 feet per minute, the speed of the casting drum was again increased to produce 6 mil thick polyethylene terephthalate cast sheet at a rate of 140 feet per minute. It is reiterated that all the conditions enumerated above in terms of relative position of the wire, the drum and the die, the pinning wire used and the voltage employed remain the same. Again, the precision positioning apparatus of this invention resulted in the production of excellent cast sheet at this drum speed.

Because of the success at 140 feet per minute, the drum speed was increased still further to 160 feet per minute. Again the conditions existing in the previous runs at 110, 120 and 140 feet per minute was reproduced. Again the pinning wire, disposed parallel to the drum produced excellent cast sheet, 6 mil thick — 14 inch wide polyethylene terephthalate film. No pinner bubbles or other surface blemishes were noticeable on the surface of the cast sheet.

Pursuant to the procedure of this example, success at 160 feet per minute prompted an increase in the drum speed to 180 feet per minute. At this speed, small amounts of pinner bubbles were noticed on the surface of the film. Therefore, the positioning apparatus of the instant invention was activated in the vertical direction to move the pinning wire closer to the surface of the drum. No other changes were made in the conditions described above. The downward vertical movement of the pinner wire changed the distance between the wire and the drum from 0.1875 inch to 0.1575 inch. As a result of this movement of 0.03 inch, excellent pinning occurred. That is, polyethylene terephthalate cast sheet, 6 mils thick and 13 inches wide was produced, having excellent surface characteristics.

With conditions maintained as were used to produce excellent film at a speed of 180 feet per minute, the drum speed was increased yet further to 200 feet per minute. At this point the capacity of the polyethylene terephthalate line to produce 6 mil cast sheet and 13 inches wide was exceeded. Thus, at 200 feet per minute 13 inch wide cast sheet of 5.4 mils (0.0054 inch) was produced. Other than the fact that the film was ten percent thinner than the previous films, due to limitations in the capacity of the film-forming line, the film had the same satisfactory characteristics. Thus, it can be said that the apparatus of this invention effected satisfactory pinning.

In view of the success at 200 feet per minute the drum speed was increased to 220 feet per minute. The conditions under which pinning occurred at 180 and 200 feet per minute were repeated during this run. Again, due to the capacity of the line the cast sheet thickness was decreased still further to 5 mils (0.005 inch). However, at 220 feet per minute small pinner bubbles appeared. No attempt was made to adjust the wire closer to the drum to overcome this defect and the example was concluded.

The above example emphasizes the improved results obtainable with the apparatus of the instant invention compared to the apparatus of the prior art. Almost a two-fold increase in the rate of film processing was obtained by use of the positioning apparatus of this invention compared to the positioning apparatus available in the prior art.

EXAMPLE III

In order to determine the criticality of parallel positioning of pinning means, in relation to the casting drum, another set of runs were made. In this set of runs, the apparatus of the instant invention was employed. The pinning means, in this case a pinning wire, was set parallel to the surface of the drum. Again, the wire had a diameter of 0.008 inch with an 8 kilovolt DC voltage source imposed across it. The pinning wire was disposed 0.25 inch from the surface of the drum while the die opening was located 0.625 inches from the surface of the drum. At this point, the pinning wire was moved 0.06 inch closer, in the vertical direction, to the surface of the drum. To effect this movement, the vertical adjusting means of the precision positioning apparatus of this invention was employed so that the pinning wire remained in parallel configuration with the casting drum. Polyethylene terephthalate cast sheet film having a width of 6 inches and a thickness of 6 mils was formed. The drum speed was 110 feet per minute. The cast sheet produced has good surface characteristics indicating good pinning.

A second run was made in which the wire was reset at its original position 0.25 inch above the surface of the drum. Employing the skew correcting adjustment means of the precision positioning apparatus, the wire was skewed by moving one end of the wire 0.06 inch closer to the surface of the drum. Thus, the wire was skewed in the vertical direction by 0.06 inch. Polyethylene terephthalate film was produced at a casting speed of 110 feet per minute. Again, satisfactory 6 mil thick, 16 inch wide film, having no surface defects, was produced indicating good pinning.

A second set of runs reproducing the same experiment as the first series of runs, albeit at a much higher rate of film casting, was made. In this set of runs the casting speed was increased to 180 feet per minute. But for this change all the other conditions of the first set of runs were unchanged. Initially the vertical adjusting means of the apparatus of this invention was employed to move the pinning wire 0.05 inch closer to the surface of the drum without disturbing the parallel relationship between the pinning wire and the casting drum. With this adjustment the wire was disposed 0.2 inch from the surface of the drum with all other variables unchanged. Polyethylene terephthalate cast sheet was produced having no surface defects, indicating good pinning. In the first run, the pinning wire was moved vertically closer to the surface of the casting drum. In this run the pinning wire was moved 0.06 inch closer to the drum again by employment of the vertical adjustment means. Thus, the film forming run was made at a distance between the drum and pinning wire of 0.19 inch. Of course, this distance was uniform along the length of the wire and drum since the wire and the drum were in parallel relationship with one another. Again good pinning was had as indicated by the absence of surface defects on the surfaces of the polyethylene terephthalate cast sheet produced.

In the second run the skew correcting adjustment means was employed to produce a skewed wire equivalent to conditions obtainable with the apparatus of the prior art. In the first of this second set of runs one end of the pinning wire was skewed by 0.05 inch. That is, the moveable pinning wire support box was moved 0.05 inch closer to the surface of the drum. Thus, at one end of the skewed wire the distance between the surface of the casting drum and the pinning wire was 0.25 inch while at the other end the distance was 0.2 inch. The casting speed was maintained at 180 feet per minute and polyethylene terephthalate cast sheet was produced. The cast sheet was characterized by pinner bubbles and other surface defects indicating poor pinning quality.

Another rum was made in which the wire was skewed to an even greater extent. In this case one end of the pinning wire, by use of the skew correcting adjustment means, was moved 0.06 inch closer to the drum than the other side so that one end of the wire was 0.25 inch from the drum while the other end of the wire was 0.19 inch from the drum. Again, polyethylene terephthalate cast sheet was produced and again the pinning quality was poor as evidenced by the presence of pinner bubbles on the surface of the cast sheet produced.

The above example is given to indicate the criticality of employing the apparatus of the instant invention to provide parallel alignment of the pinning means with the casting drum. This example is also given to indicate why the criticality of positioning was not completely appreciated in the prior art. A drum speed of 110 feet per minute represented normal processing conditions. As this example indicated, at this relatively low casting rate, parallel positioning is not very critical for good pinning. However, at higher speeds, representing the trend in the art, slight skew of the pinning means makes the difference between successful and unsuccessful pinning.

The preferred embodiment and examples given above illustrate the scope and spirit of the instant invention. Other embodiments and examples within the scope and spirit of the instant invention are within the contemplation of this invention. Therefore, the scope of this invention should be limited only by the appended claims.

What is claimed is:

1. An apparatus for the precision positioning of electrostatic pinning means comprising
    a frame moveable in the horizontal and vertical directions;
    pinning means support means connected to said frame;
    an electrostatic pinning means held by said pinning means support means;
    horizontal adjusting means, connected to said frame, comprising a horizontal actuating means connected to horizontally moveable means responsive to said horizontal actuating means;
    horizontal precision control means, cooperating with said horizontal adjusting means, and connecting to said moveable frame;
    vertical adjusting means, connected to said frame, comprising a vertical actuating means connected to vertically moveable means responsive to said vertical actuating means; and
    vertical precision control means, cooperating with said vertical adjusting means, and connected to said moveable means.

2. An apparatus in accordance with claim 1 wherein said frame comprises a horizontal frame member and two vertical frame members extending from each end of said horizontal frame member.

3. An apparatus in accordance with claim 1 wherein said horizontal and vertical actuating means comprises a handwheel.

4. An apparatus in accordance with claim 1 wherein said horizontal and said vertical adjusting means comprises an electrical motor.

5. An apparatus in accordance with claim 1 wherein said horizontal and said vertical actuating means comprises a source of pressurized liquid, provided with means of ingress and egress, disposed in a closed cylinder.

6. An apparatus in accordance with claim 1 wherein said horizontally moveable means responsive to said horizontal actuating means comprises a horizontally moveable threaded bolt provided with a thrust bearing near the downstream end of said bolt, and a collar surrounding a linear slide bearing located adjacent to, and downstream of, said thrust bearing.

7. An apparatus in accordance with claim 1 wherein said vertically moveable means responsive to said vertical actuating means comprises a rotatable threaded bolt in communication with a vertically moveable block provided with tapped hole through which said threaded bolt is disposed, said moveable block being connected to said frame.

8. An apparatus in accordance with claim 1 wherein said horizontal precision control means comprises a precision round bar, supported by rigid support members connected to said frame, and at least one slide bearing rigidly connected to said frame, which moves horizontally on said round bar in response to movement imparted by said horizontal adjustment means.

9. An apparatus in accordance with claim 1 including a stationary structural support acting independently of said moveable frame.

10. An apparatus in accordance with claim 9 wherein said vertical precision control means comprises at least one precision round bar, held stationary by connection to said stationary structural support, and at least one slide bearing, connected to said frame, which slides vertically on said round bar in response to movement imparted by said vertical adjustment means.

11. An apparatus in accordance with claim 1 wherein said pinning means support means comprises at stationary pinning means support box and a moveable pinning means support box.

12. An apparatus in accordance with claim 11 including a skew correcting adjustment means connected to and in communication with said moveable pinning means support box.

13. An apparatus in accordance with claim 12 wherein said skew correcting adjustment means comprises:
- horizontal skew adjustment means comprising a horizontal actuating means and horizontally moveable means responsive to said horizontal actuating means; and
- vertical skew adjustment means comprising a vertical actuating means and vertically moveable means responsive to said vertical actuating means.

14. In combination with a casting drum and an electrostatic pinning means, an apparatus for the precision positioning of said pinning means comprising:
- a moveable frame, including a horizontal frame member and two vertical frame members extending from each end of said horizontal frame member;
- electrostatic pinning means support means including a stationary pinning means support box provided on one end of one of said vertical frame members and a moveable pinning means support box provided on one end of said other vertical frame member;
- skew correcting adjustment means connected to and in communication with said moveable pinning means support box;
- a stationary support structure disposed independently of said moveable frame;
- horizontal adjusting means, connected to said frame, comprising a horizontal actuating means connected to horizontally moveable means responsive to said horizontal actuating means;
- horizontal precision control means, cooperating with said horizontal adjusting means, and connecting to said moveable frame;
- vertical adjusting means, connected to said frame, comprising a vertical actuating means connected to vertically moveable means responsive to said vertical actuating means; and
- vertical precision control means, cooperating with said vertical adjusting means, and connected to said moveable means and said stationary support structure.

15. An apparatus in accordance with claim 14 including a box frame connected to said horizontal frame member.

16. An apparatus in accordance with claim 15 wherein said skew correcting adjustment means comprises (a) horizontal skew adjustment means including a horizontal actuating means, and horizontally moveable means responsive to said horizontal actuating means, and (b) vertical skew adjustment means including a vertical actuating means and vertically moveable means responsive to said vertical actuating means.

17. An apparatus in accordance with claim 16 wherein said horizontal actuating means of said horizontal skew correcting means and said vertical actuating means of said vertical skew correcting means each comprise a handwheel.

18. An apparatus in accordance with claim 17 wherein said horizontally moveable means responsive to said horizontal actuating means and said vertically moveable means responsive to said vertical actuating means each comprises a dovetail slide comprising a moveable member, responsive to said handwheel, moveable in a stationary dovetail frame, said moveable members each being connected to said moveable pinning means support box.

* * * * *